(12) United States Patent
Wardman et al.

(10) Patent No.: US 11,086,990 B2
(45) Date of Patent: Aug. 10, 2021

(54) SECURITY MODULE FOR MOBILE DEVICES

(71) Applicant: PayPal, Inc., San Jose, CA (US)

(72) Inventors: Bradley Wardman, Phoenix, AZ (US); Meethil Vijay Yadav, Scottsdale, AZ (US); Nathan Robert Pratt, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 101 days.

(21) Appl. No.: 16/228,049

(22) Filed: Dec. 20, 2018

(65) Prior Publication Data

US 2019/0332767 A1     Oct. 31, 2019

Related U.S. Application Data

(63) Continuation-in-part of application No. 15/966,911, filed on Apr. 30, 2018.

(51) Int. Cl.

| | |
|---|---|
| *G06F 21/55* | (2013.01) |
| *G06F 21/56* | (2013.01) |
| *G06F 21/52* | (2013.01) |
| *H04L 29/06* | (2006.01) |
| *G06F 16/955* | (2019.01) |

(52) U.S. Cl.
CPC .......... *G06F 21/554* (2013.01); *G06F 16/955* (2019.01); *G06F 21/52* (2013.01); *G06F 21/566* (2013.01); *H04L 63/0236* (2013.01); *H04L 63/101* (2013.01); *H04L 63/1433* (2013.01); *G06F 2221/2119* (2013.01); *G06F 2221/2141* (2013.01)

(58) Field of Classification Search
CPC ...... G06F 16/955; G06F 21/52; G06F 21/554; G06F 2221/2119; G06F 2221/2141; H04L 63/0236; H04L 63/101; H04L 63/1433
See application file for complete search history.

(56) References Cited

U.S. PATENT DOCUMENTS

| | | | |
|---|---|---|---|
| 2009/0037976 A1* | 2/2009 | Teo ....................... | H04L 63/102 726/1 |
| 2015/0156203 A1* | 6/2015 | Giura .................. | H04L 63/0281 726/4 |

(Continued)

OTHER PUBLICATIONS

Tomasz Bujlow • Valentin Carela-Espanol • Beom-Ryeol Lee • Pere Barlet-Ros; A Survey on Web Tracking: Mechanisms, Implications, and Defenses; Proceedings of the IEEE (vol. 105, Issue: 8, pp. 1476-1510); (Year: 2017).*

(Continued)

*Primary Examiner* — Luu T Pham
*Assistant Examiner* — Chao Wang
(74) *Attorney, Agent, or Firm* — Haynes and Boone, LLP

(57) ABSTRACT

A computer system detects an action corresponding to a resource page being rendered within a web view of an application. In response to the detecting the action corresponding to a resource page being rendered within the web view of the application, the computer system identifies information associated with the resource page and determines if one or more risk indications correspond to the identified information. In response to determining that one or more risk indications correspond to the identified information, the computer system implements one or more security measures.

20 Claims, 5 Drawing Sheets

(56) References Cited

U.S. PATENT DOCUMENTS

2016/0294867 A1* 10/2016 Tao ................... H04L 63/1416
2017/0289267 A1* 10/2017 Eschbach ............... H04L 67/02

OTHER PUBLICATIONS

E. Fgee • E. H. Elturki • A. Elhounie; My Security for Dynamic Websites in Educational Institution; 2012 Sixth International Conference on Next Generation Mobile Applications, Services and Technologies (pp. 53-59); (Year: 2012).*

T. Hollebeek • D. Berrier; Interception, wrapping and analysis framework for Win32 scripts; Proceedings DARPA Information Survivability Conference and Exposition II. DISCEX'01 (vol. 2, pp. 222-229 vol. 2); (Year: 2001).*

* cited by examiner

SECURITY MODULE FOR MOBILE DEVICES

CROSS REFERENCE TO RELATED APPLICATIONS

This application is a Continuation-in-Part of U.S. patent application Ser. No. 15/966,911, filed Apr. 30, 2018, which is incorporated by reference in its entirety.

TECHNICAL FIELD

The present disclosure relates to mobile devices, and more particularly to providing security measures for usage of applications on mobile devices.

BACKGROUND

Today, with the availability of mobile devices, users are able to have the power to make digital payments, access social media accounts, access financial account, and/or access almost any information no matter where they are. In most cases, accessing these personal accounts involves a user inputting certain authentication credentials into an application or web interface. If a user is utilizing a laptop, oftentimes a browser on a laptop may utilize browser blacklists to determine if a website that a user is visiting is "blacklisted" or a potentially "malicious website". However, applications on mobile devices do not always have similar capabilities to check for malicious websites (and therefore cannot utilize these techniques), which may allow a fraudster to attack a mobile device and user by utilizing fraud techniques. In addition, users of applications may be increasingly susceptible to attacks when utilizing the web view functionality within applications. Web view (also referred to as "webview" or "WebView" in some instances) functionality within an application allows an application to, for example, render a web page corresponding to a URL within the application (therefore, not requiring an external browser). Nevertheless, applications are currently not providing security against malicious attacks when a user selects an option to render a web view as they are not as mature as browsers nor are held to same standards. An improved fraud prevention method may help mobile device users from being harmed by fraudulent techniques.

DETAILED DESCRIPTION

Figure 1:
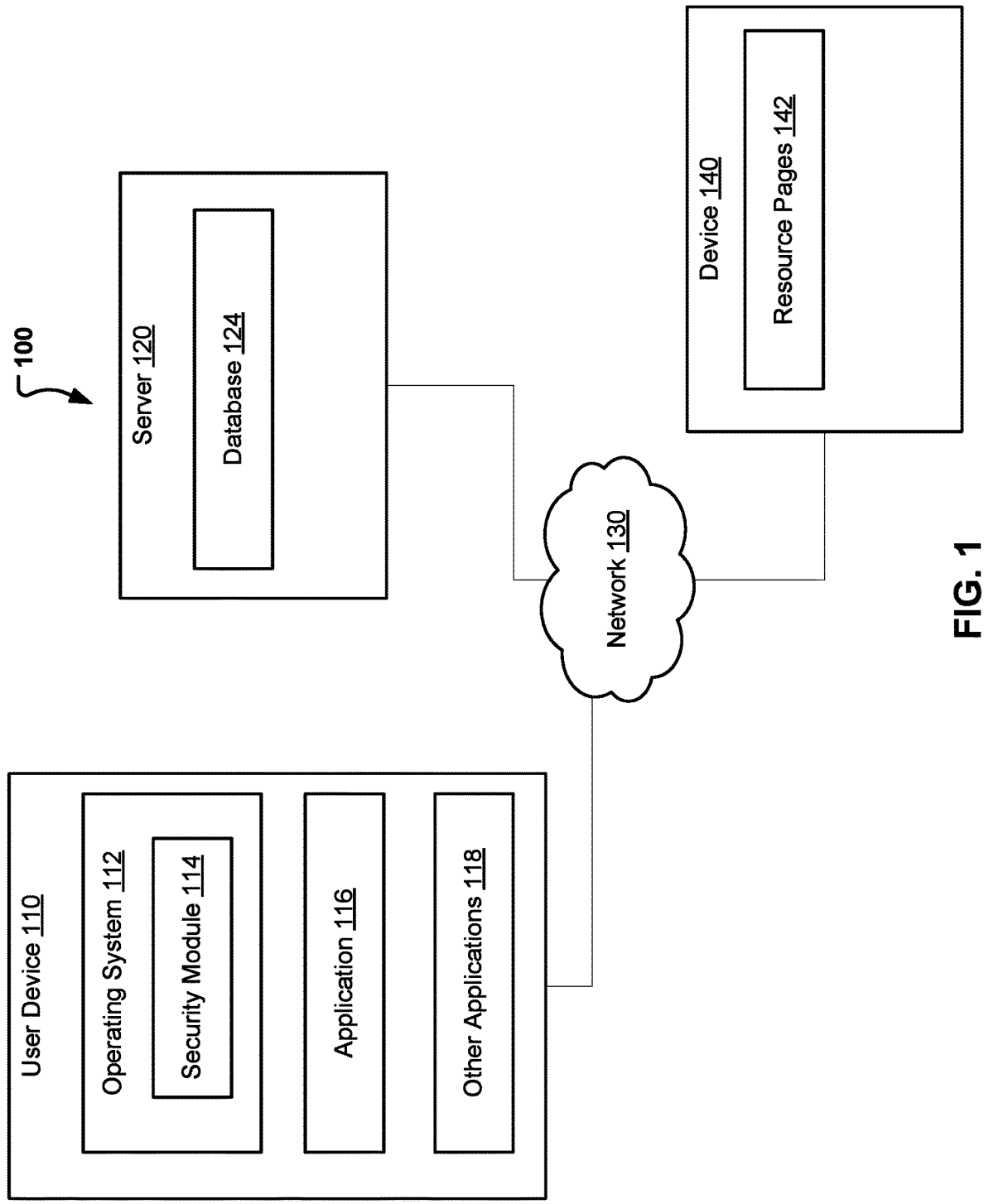
FIG. 1 illustrates a security system, in accordance with an embodiment.

Embodiments of the present disclosure provide a system, method, and program product. A computer system detects an action corresponding to a resource page being rendered within a web view (also referred to as "webview" or "WebView" in some instances) of an application. In response to detecting the action corresponding to a resource page being rendered within the web view of the application, the computer system identifies information associated with the resource page and determines if one or more risk indications correspond to the identified information. In response to determining that one or more risk indications correspond to the identified information, the computer system implements one or more security measures.

In further embodiments, a computer system determines that a web view of a resource page has been rendered in an application. In response to determining that the web view of the resource page has been rendered in the application the computer system marks the resource page. The computer system identifies information corresponding to the resource page and determines if one or more risk indications correspond to the identified information. In response to determining that one or more risk indications correspond to the identified information, the computer system implements one or more security measures.

As stated above, applications on mobile devices do not provide the capability to identify malicious resource pages that are potentially fraudulent. This leaves mobile device users susceptible to "phishing attacks" and other fraudster attacks. In particular, an application with the functionality to render a web view may be particularly susceptible due to the lack of security measures that take place prior to a web view being rendered in an application. In the example embodiment, the present disclosure describes a solution that provides a system, method, and program product for identifying potentially malicious resource pages in order to take one or more security measures to protect a user. In the example embodiment, the present disclosure describes a solution that monitors device activity and determines if a web view of one or more resource pages is being requested to be rendered in an application. In response to determining that a web view of one or more resource pages has been requested to be rendered in an application, the present disclosure describes a solution that determines information associated with the one or more resource pages, and further determines if the information corresponds to one or more risk flags. If the present disclosure determines that the information corresponds to one or more risk flags, the present solution may take one or more security measures such as intercepting the resource page prior to it being rendered in the web view (e.g., while notifying the user of the risk flags) or blocking the resource page from being rendered in web view.

Furthermore, in additional embodiments, the present disclosure describes a solution for identification of risk flags after the web view has been rendered in the application. In these additional embodiments, the present disclosure describes a solution that detects that a web view of one or more resource pages has been rendered in an application. In response to detecting the device has rendered the web view of the one or more resource pages, the present disclosure describes marking the one or more resource pages, and further checking for risk flags. If risk flags are detected, the present disclosure describes notifying the user and taking one or more security measures.

Embodiments of the present disclosure will now be described in detail with reference to the accompanying Figures.

FIG. 1 illustrates security system 100, in accordance with an embodiment. In the example embodiment, security system 100 includes user device 110, server 120, and device 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between user device 110 and device 140.

In the example embodiment, server 120 includes database 124. In the example embodiment, server 120 may be a desktop computer, a laptop computer, a tablet computer, a mobile device, a handheld device, a thin client, or any other electronic device or computing system capable of receiving and sending data to and from other computing devices, such as user device 110, via network 130. Although not shown, optionally, server 120 can comprise a cluster of servers executing the same software to collectively process requests as distributed by a front-end server and a load balancer. Server 120 is described in more detail with regard to the figures.

In the example embodiment, database 124 is a storage device that includes information corresponding to one or more risk flags. In the example embodiment, database 124 may include information such as blacklisted uniform resource locators (URL), blacklisted IP addresses, blacklisted autonomous system numbers (ASNs), blacklisted domain names, blacklisted company names, blacklisted locations (e.g., addresses, cities, states, countries, regions, etc.), blacklisted applications (or hashes of application files), blacklisted phone numbers, blacklisted usernames, blacklisted email addresses, blacklisted developer websites, and/or additional information (including other types of blacklists) that may be used to determine if a website or a request for information is a "phishing attempt". Database 124 is described in further detail with regard to the figures.

In the example embodiment, device 140 includes resource page 142. In the example embodiment, device 140 may be a desktop computer, a laptop computer, a tablet computer, a mobile device, a handheld device, a thin client, or any other electronic device or computing system capable of receiving and sending data to and from other computing devices, such as user device 110, via network 130. Device 140 is described in more detail with regard to the figures.

In the example embodiment, resource pages 142 comprises of one or more resource pages. In the example embodiment, the resource pages may be in various formats, such as text, audio, video, etc. Furthermore, resource pages 142 may correspond to a specific application (loadable by a specific application), may correspond to a variety of applications, and/or may be a webpage. Resource pages 142 is described in more detail with regard to the figures.

In the example embodiment, user device 110 includes application 116, other applications 118, and operating system 112. Furthermore, while in the example embodiment, user device 110 is a mobile device, in other embodiments, user device 110 may be a desktop computer, a laptop computer, a tablet computer, a handheld device, a thin client, or any other electronic device or computing system capable of receiving and sending data to and from other computing devices, such as device 140, via network 130. User device 110 is described in more detail with reference to the figures.

In the example embodiment, application 116 is an application that is capable of communicating with other computing devices, such as an application server, to transmit request and a receive information. Furthermore, application 116 is capable of displaying received information to the user of user device 110. In the example embodiment, application 116 is a client-side application, however, in other embodiments, application 116 may be a server-side application. Application 116 is described in further detail with regard to the figures.

In the example embodiment, other applications 118 include one or more applications that are present on user device 110. In the example embodiment, other applications 118 may also be capable of transmitting requests to one or more computing devices and furthermore receiving information back from the one or more computing devices. Other applications 118 are described in further detail with regard to the figures.

In the example embodiment, operating system 112 includes security module 114. Security module 114 is a software component of operating system 112 that may be capable of detecting if the user of user device 110 has taken an action that corresponds to one or more resource pages being rendered in a web view within an application on user device 110. Further, security module 114 may be capable of determining information corresponding to the one or more resources pages and corresponding to one or more entities associated with the one or more resource pages. Additionally, security module 114 may be capable of analyzing the information to determine if the information corresponds to one or more risk flags. In addition, if security module 114 determines that the information corresponds to one or more risk flags, security module 114 is capable of taking one or more actions to provide the user of user device 110 an indication of the one or more risk flags associated with the one or more resource pages. While in the example embodiment security module 114 is a component of the operating system, in other embodiments, security module 114 may be a stand-alone program or application. Operating system 112 and security module 114 are described in further detail with regard to the figures.

Furthermore, in one or more embodiments, security module 114 may utilize an application programming interface (API) in communicating with application 116, other applications 118, and further in communicating with database 124.

Figure 2:
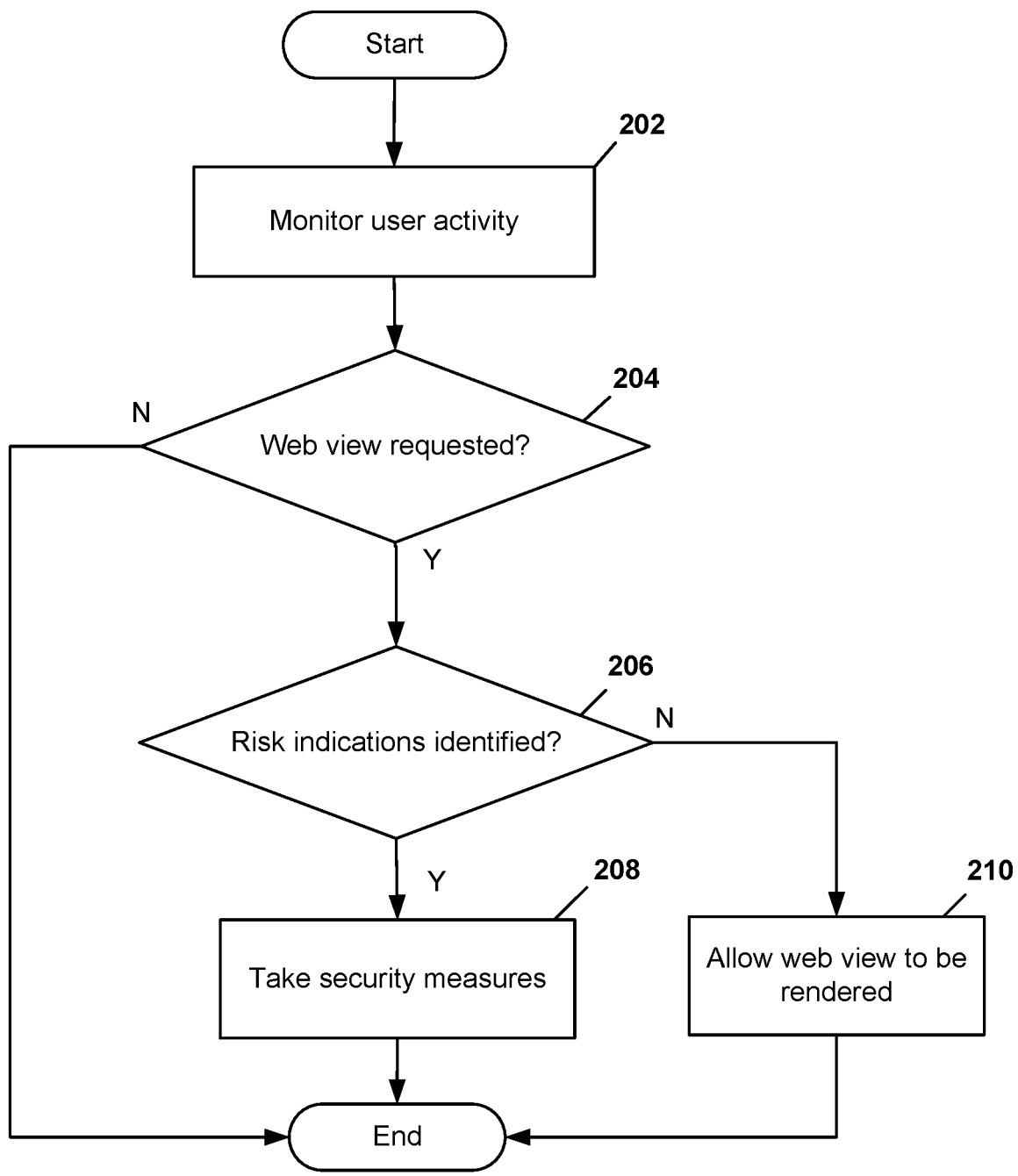
FIG. 2 is a flowchart illustrating the operations of the security module of FIG. 1 in detecting if a web view is being requested, and based on the detecting, determining whether to take one or more security measures, in accordance with an embodiment.

FIG. 2 is a flowchart illustrating the operations of the security module 114 in detecting if a web view is being requested, and based on the detecting, determining whether to take one or more security measures, in accordance with an embodiment. In the example embodiment, security module 114 monitors user activity on user device 110 (step 202). In the example embodiment, security module 114 may monitor browsing activity being conducted on application 116, and further may monitor activity on one or more applications on user device 110, such as other applications 118.

In the example embodiment, security module 114 detects whether an action corresponding to one or more resource pages being rendered in a web view of an application, such as application 116, has been taken (decision 204). For example, a selectable element (e.g., corresponding to a resource page, such as from resource pages 142) may be displayed to a user of user device 110 within application 116 (such as via a URL) which, if selected, would result in the retrieval of the resource page from a server, and further, in the loading of the resource page within a web view of application 116 (or another application). In the example embodiment, security module 114 may detect whether the selectable element (i.e., corresponding to a resource page) within application 116 has been selected.

If security module 114 detects that an action corresponding to one or more resource pages (e.g., such as one or more of resource pages 142) being rendered in a web view of an application has not been taken (decision 204, "NO" branch), security module 114 continues to monitor user activity as stated above. If security module 114 detects that an action corresponding to one or more resource pages being rendered in a web view of an application has been taken (decision 204, "YES" branch), security module 114 identifies information corresponding to the one or more resource pages and further identifies if there are any risk indications associated with the one or more resource pages (decision 206). Referring to the example above, upon detecting that the selectable element (within application 116) has been selected, security module 114 may identify information associated with the one or more resource pages associated with the selectable element. For example, security module 114 may identify information from a Secure Sockets Layer (SSL) Certificate associated with the one or more resource pages, and further identify information associated with an entity associated with the one or more resource pages (e.g., such as an owner/operator or administrator of the one or more resource pages, the server hosting the one or more resource pages, the hosting provider hosting the one or more resource pages, domain registration info, hosting IP address, etc.). Security module 114 may then cross-reference the identified information associated with the one or more resource pages against risk indications contained in database 124 and determine if the identified information is associated with any risk indications. For example, security module 114 may analyze the SSL certificate corresponding to the one or more resource pages and determine that the owner of the one or more resource pages (determined, for example, by an email address, a name, an address, a hosting IP address, a hosting company, etc.) is a Nigerian company that is blacklisted (or alternatively, may determine that the owner of the website corresponding to a region that is blacklisted). In another example, security module 114 may cross-reference one or more URLs associated with the one or more resource pages against risk indications contained in database 124 and determine if the one or more URLs corresponds to any risk indications in database 124. In one or more embodiments, along with cross-referencing against risk indications contained in database 124, security module 114 may additionally cross-reference against one or more threat feeds and/or one or more risk scoring systems in order to identify if the identified information associated with the one or more resource pages corresponds to one or more risk indications.

If security module 114 identifies that there are risk indications associated with the one or more resource pages (decision 206, "YES" branch), security module 114 may take one or more security measures (step 208). In the example embodiment, the security measures may include notifying the user of user device 110 of the risk indications associated with the one or more resource pages and/or may include intercepting the one or more resource pages and preventing the one or more resource pages from being rendered in a web view of the corresponding application. In another embodiment, the security measures may include notifying the user of user device 110 of the risk indications associated with the one or more resource pages while also presenting one or more options (e.g., selectable options) which the user may utilize to proceed (or not proceed) with rendering of the one or more resource pages in a web view of the corresponding application. In this other embodiment, security module 114 may temporarily intercept the transmission of the one or more resource pages to prevent them from being rendered until the user of user device 110 has provided input as to whether to proceed (or not proceed) with the rendering of the one or more resource pages. In addition, security module 114 may update database 124 based on the input received from the user of user device 110 with regard to the one or more resource pages. For example, if the user of user device 110 opts to choose an option to allow the one or more resource pages to be rendered in a web view after being provided with the notification of the risk indications, security module 114 may update a record of database 124 associated with the one or more resource pages to reflect the user input. Therefore, in the future, security module 114 may allow the one or more resource pages to be rendered in a web view of a corresponding application without prompting the user (i.e., to provide input based on the risk indications) and/or without intercepting the transmission of the one or more resource pages. In the example embodiment, the application corresponding to the rendering of the one or more resource pages may be the same as the application where the action associated with the one or more resource pages being rendered in a web view is taken or may be a different application.

If security module 114 identifies that there are no risk indications associated with the one or more resource pages (decision 206, "NO" branch), security module 114 may allow the one or more resources to be rendered in a web view of the corresponding application (step 210). For example, after detecting that an action corresponding to one or more resource pages being rendered in a web view of application 116 has been taken, if security module 114 determines that there are no risk indications associated with the one or more resource pages, security module 114 may allow the one or more resource pages to be rendered in the web view of application 116. While in the example embodiment, the action is detected as taken within application 116 and the one or more resources are rendered in a web view of application 116, in other embodiments, the action may be detected as taken within application 116, but the one or more resources may be rendered in a web view of another application (e.g., such as other applications 118).

Figure 3:
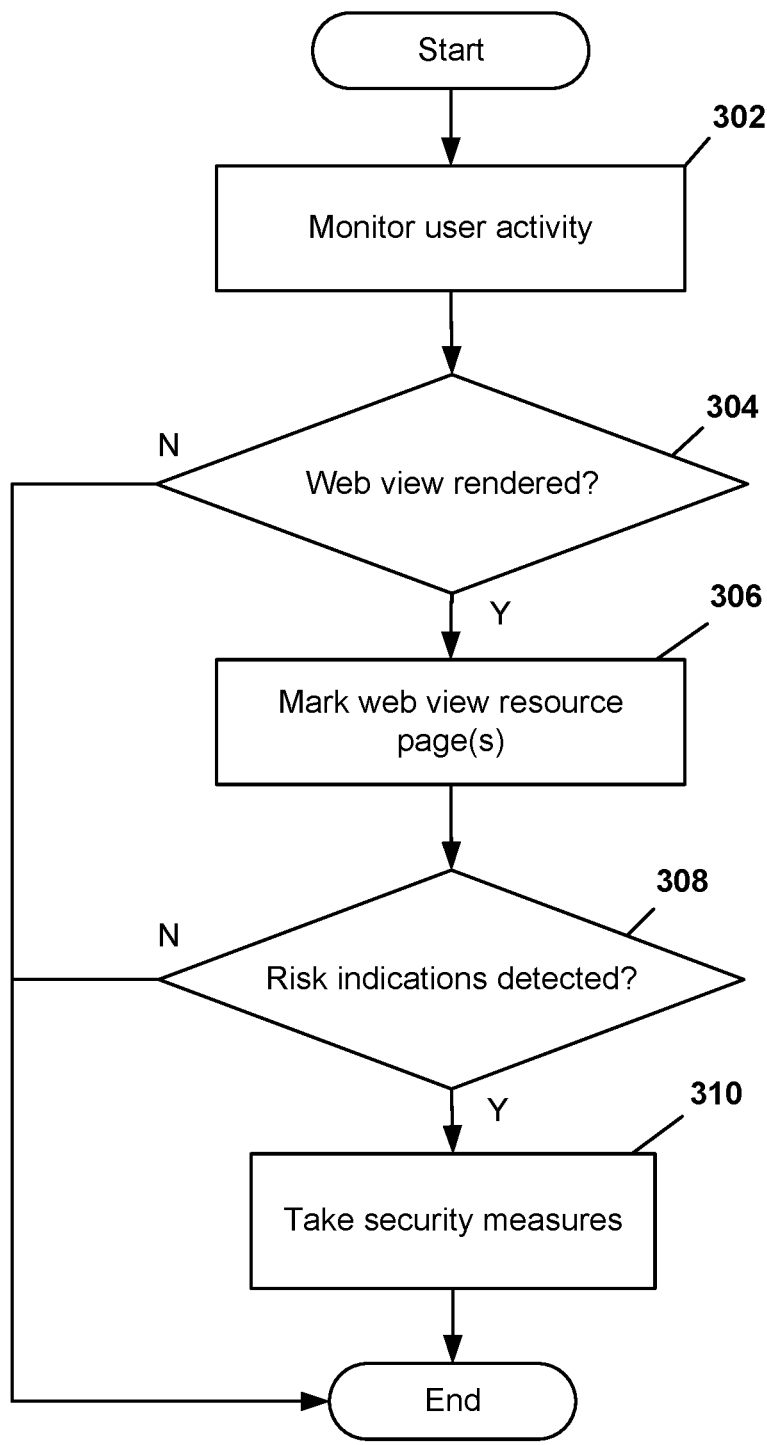
FIG. 3 is a flowchart illustrating the operations of the security module of FIG. 1 in detecting if a web view has been rendered, and based on the detecting, determining whether the take one or more security measures, in accordance with an embodiment.

FIG. 3 is a flowchart illustrating the operations of the security module 114 in detecting if a web view has been rendered, and based on the detecting, determining whether the take one or more security measures, in accordance with an embodiment. In the example embodiment, security module 114 monitors user activity on user device 110 (step 302). In the example embodiment, security module 114 may monitor browsing activity being conducted on application 116, and further may monitor activity on one or more applications on user device 110, such as other applications 118.

In the example embodiment, security module 114 determines whether one or more resource pages (e.g., such as one or more of resource pages 142) have been rendered in a web view of an application, such as application 116, on user device 110 (decision 304). In the example embodiment, security module 114 may determine whether one or more resource pages have been rendered in a web view of an application of user device 110 by detecting whether a web view has been launched within an application, such as application 116. In another embodiment, security module 114 may determine whether one or more resource pages have been rendered in a web view by detecting whether an action corresponding to one or more resource pages being rendered in a web view of an application, such as application 116, has been taken. For example, a selectable element (corresponding to a resource page) may be displayed to a user of user device 110 within application 116 (e.g., such as via a URL) which, if selected, would result in the retrieval of the resource page from a server, and further, in the loading of the resource page within a web view of application 116 (or another application). In the example embodiment, security module 114 may detect whether the selectable element (corresponding to a resource page) within application 116 has been selected.

If security module 114 determines that one or more resource pages have not been rendered in a web view of an application (decision 304, "NO" branch), security module 114 continues to monitor user activity as stated above. If security module 114 determines that one or more resource pages have been rendered in a web view of an application (decision 304, "YES" branch), security module 114 marks the webpage (step 306) and further identifies if there are any risk indications associated with the one or more resource pages (decision 308). For example, upon determination that one or more resource pages have been rendered in a web view of an application on user device 110, security module 114 may mark the webpage, and further analyze information corresponding to the one or more resource pages (i.e., the URL(s), the owner or administrator associated with one or more resource pages, the server hosting the one or more resource pages, the hosting provider hosting the one or more resource pages, etc.). As stated above, in one or more embodiments, security module 114 may analyze information corresponding to the one or more resource pages and may further analyze a Secure Socket Layer (SSL) Certificate associated with the one or more resource pages to identify requestor information. Security module 114 may then cross-reference the information associated with the one or more resource pages against risk indications contained in database 124 and determine if the information corresponds to any risk indicators. Furthermore, as stated above, threat feeds, additional blacklists not contained in database 124, and risk scoring systems may also be utilized in determining if the information associated with the one or more resource pages corresponds to any risk indications.

In other embodiments, upon determining has been transmitted, security module 114 may mark the one or more resource pages and may analyze if there are risk indications associated with the information at a later time. For example, security module 114 may analyze if there are risk indications associated with the marked resource pages periodically, such as at the end of each business day, at the end of the week, or at the end of the month. In another example, security module 114 may detect that user device 110 is not connected to the network (network 130), and based on that may continue to cache marked resource pages until security module 114 detects that network connectivity is available (at which point security module 114 may analyze if there are risk indications associated with the marked resource pages).

If security module 114 determines that the information associated with the one or more resource pages does correspond to one or more risk indications (decision 308, "YES" branch), security module 114 may take one or more security measures (step 310). In the example embodiment, the security measures may include notifying the user (e.g., such as sending an email, text message or phone call notification) of the risk indications corresponding to the one or more resource pages. In addition, security module 114 may additionally recommend further security actions (e.g., such as changing a password, deleting an account, changing or removing certain financial or personal information, etc.). Furthermore, the security measures may additionally include, as stated above, determining if one or more records in database 124 need to be updated and further, based on the determining, updating the records. Furthermore, in one or more embodiments, user input may be requested with regard to each of the marked one or more resource pages that correspond to one or more risk indications. If the user provides input that a certain resource page is acceptable, then security module 114 may update one or more records in database 124 to reflect that. If security module 114 determines that the information associated with the one or more resource pages does not correspond to any risk indications (decision 308, "NO" branch), security module 114 continues to monitor user activity as described above.

Furthermore, in one or more embodiments, upon initial load, security module 114 may be configured to analyze user history, including application usage and resource pages visited to determine if the visited resource pages correspond to one or more risk indications. Furthermore, if security module 114 determines that visited resource pages corresponds to one or more risk indications, security module 114 may notify the user, in a similar manner as described above, and further may recommend further security actions (such as changing a password, deletion of an account, changing or removing certain financial or personal information, etc.).

Figure 4:
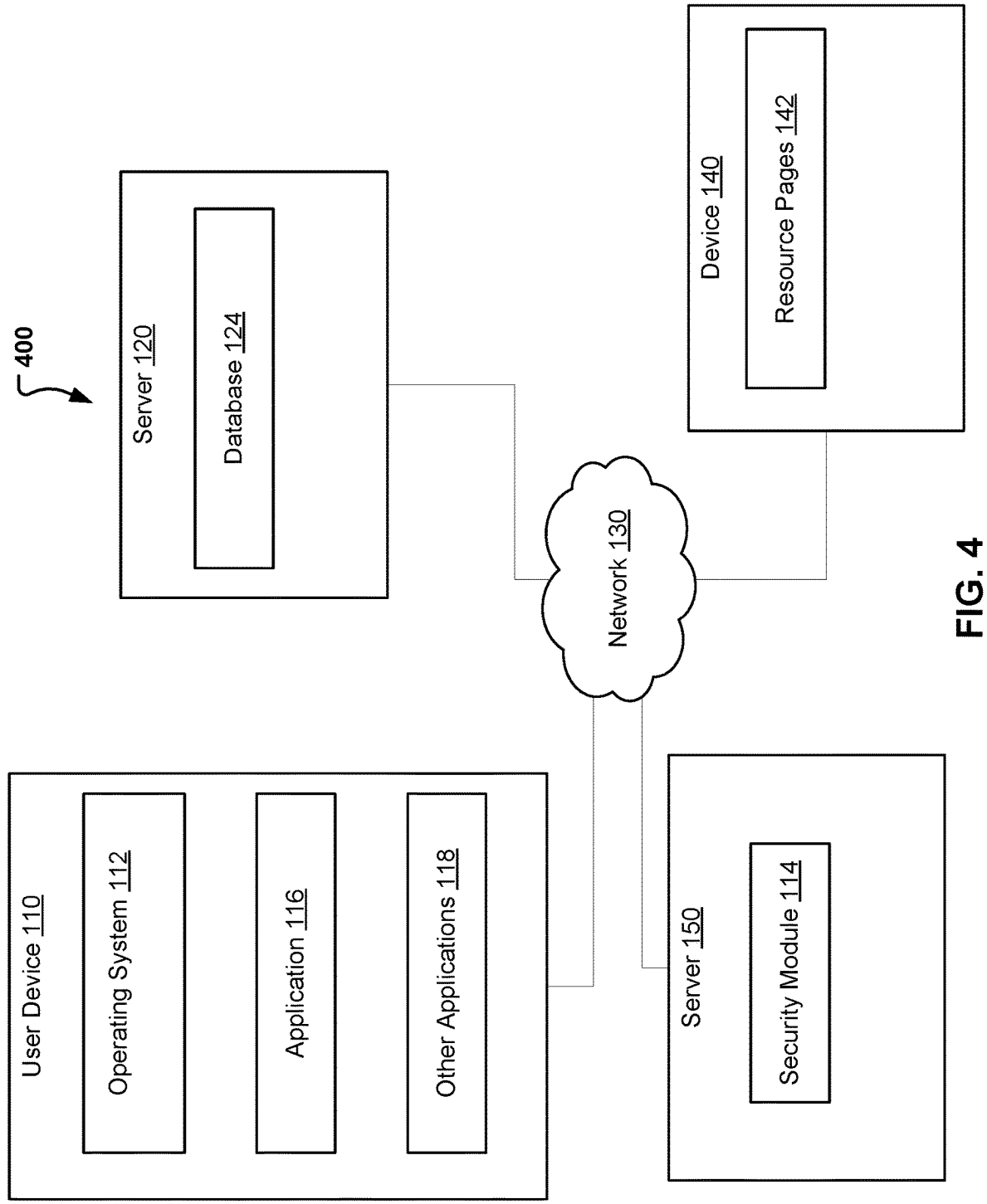
FIG. 4 illustrates an alternate embodiment of the security system of FIG. 1, in accordance with an embodiment.

FIG. 4 illustrates an alternate embodiment of the security system of FIG. 1, in accordance with an embodiment. In the example embodiment, FIG. 4 depicts a security system 400 where security module 114 is located on remote server 150. In the example embodiment, security module 114 monitors user activity on user device 110 via network 130, or alternatively, may monitor user activity by communicating with a client security module located on user device 110. In the example embodiment, security module 144 may represent a server side program that may monitor user activity and perform the steps discussed in FIGS. 2 and 3 for a number of client devices.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
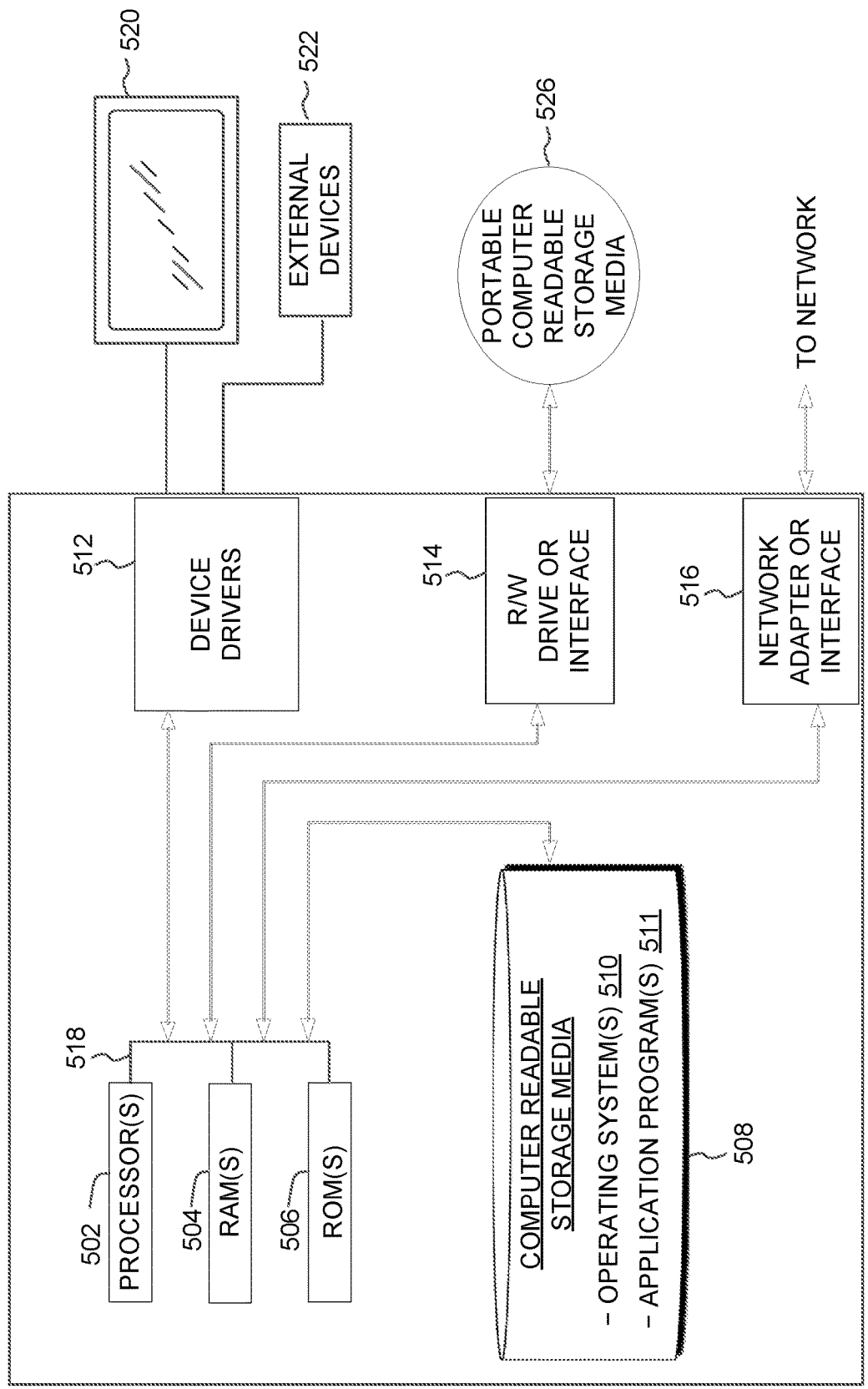
FIG. 5 is a block diagram depicting the hardware components of the security system of FIG. 1 and the security system of FIG. 4, in accordance with an embodiment.

FIG. 5 depicts a block diagram of components of computing devices contained in security system 100 of FIG. 1 and security system 400 in FIG. 4, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, security module 114, are stored on one or more of the computer readable storage media 508 for execution by one or more of the processors 502 and by utilizing one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A mobile device, comprising:
one or more computer-readable memories storing program instructions; and
one or more processors configured to execute the program instructions to cause the mobile device to perform operations comprising:
detecting, using a security module executed by an operating system of the mobile device, an action corresponding to a resource page being rendered within a web view of an application on the mobile device, wherein the action is detected in the application by the security module via an application programming interface (API) of the security module of the mobile device;
in response to the detecting the action corresponding to the resource page being rendered within the web view of the application, identifying information associated with the resource page;
determining a secure sockets layer (SSL) certificate associated with the resource page;
analyzing the SSL certificate;
determining an owner of the resource page based on the analyzing;
identifying at least one of a server or a hosting provider for the resource page based on a hosting Internet Protocol (IP) address associated with the SSL certificate;
determining a region hosting the resource page based on the identifying at least one of the server or the hosting provider;
determining if one or more risk indications correspond to the identified information, the owner of the resource page, and the region of the resource page; and
in response to determining that the one or more risk indications correspond to the identified information, the owner of the resource page, and the region of the resource page, implementing one or more security measures, wherein the implementing the one or more security measures includes:
intercepting the resource page prior to it being rendered within the web view of the application; and
providing a notification to a user of the mobile device indicating the resource page corresponds to the one or more risk indications.

2. The mobile device of claim 1, wherein the identified information includes a uniform resource locator (URL) or an entity associated with the resource page.

3. The mobile device of claim 1, wherein the determining if the one or more risk indications correspond to the identified information includes:
accessing a blacklist database and identifying if the identified information corresponds to a record in the blacklist database.

4. The mobile device of claim 1, wherein the implementing the one or more security measures further includes blocking the resource page from being rendered within the web view of the application.

5. The mobile device of claim 1, wherein the detecting the action corresponding to the resource page being rendered within the web view of the application includes detecting a selection of a selectable element corresponding to the resource page, the selectable element provided by the application.

6. The mobile device of claim 1, wherein the detecting the action corresponding to the resource page being rendered within the web view of the application includes detecting a selection of a selectable element corresponding to the resource page, the selectable element provided by another application.

7. A mobile device, comprising:
one or more computer-readable memories storing program instructions; and
one or more processors configured to execute the program instructions to cause the mobile device to perform operations comprising:
determining, using a security module executed by an operating system of the mobile device, that a web view of a resource page has been rendered in an application, wherein the web view is determined to be rendered in the application by the security module via an application programming interface (API) of the security module;
in response to determining that the web view of the resource page has been rendered in the application, marking the resource page;
identifying information corresponding to the resource page;
determining a secure sockets layer (SSL) certificate associated with the resource page;
analyzing the SSL certificate;
determining an owner of the resource page based on the analyzing;
identifying at least one of a server or a hosting provider for the resource page based on a hosting Internet Protocol (IP) address associated with the SSL certificate;
determining a region hosting the resource page based on the identifying at least one of the server or the hosting provider;
determining if one or more risk indications correspond to the identified information, the owner of the resource page, and the region of the resource page; and
in response to determining that the one or more risk indications correspond to the identified information, the owner of the resource page, and the region of the resource page, implementing one or more security measures, wherein the implementing the one or more security measures includes:
intercepting the resource page prior to it being rendered within the web view of the application; and
providing a notification to a user of the mobile device indicating the resource page corresponds to the one or more risk indications.

8. The mobile device of claim 7, wherein the resource page is an application page or a webpage.

9. The mobile device of claim 7, wherein the determining that the web view of the resource page has been rendered in the application includes detecting a selection of a selectable element corresponding to the resource page, the selectable element provided by the application.

10. The mobile device of claim 7, wherein the determining if the one or more risk indications correspond to the identified information includes:
accessing a blacklist database and identifying if the identified information corresponds to the one or more risk indications in the blacklist database.

11. The mobile device of claim 7, wherein the identified information corresponding to the resource page includes a URL associated with the resource page or an administrator associated with the resource page.

12. The mobile device of claim 7, wherein the implementing the one or more security measures further includes notifying a third-party computing system associated with a blacklist that the resource page corresponds to the one or more risk indications.

13. The mobile device of claim 7, wherein the implementing the one or more security measures further includes receiving a user input corresponding to the resource page, and in response to receiving the user input, updating one or more records in a database that corresponds to the resource page.

14. A method, comprising:
detecting, using a security module executed by an operating system of a mobile device, an action corresponding to a resource page being rendered within a web view of an application, wherein the action is detected in the application by the security module via an application programming interface (API) of the security module;
in response to the detecting the action corresponding to the resource page being rendered within the web view of the application, identifying information associated with the resource page;
determining a secure sockets layer (SSL) certificate associated with the resource page;
analyzing the SSL certificate;
determining an owner of the resource page based on the analyzing;
identifying at least one of a server or a hosting provider for the resource page based on a hosting Internet Protocol (IP) address associated with the SSL certificate;
determining a region hosting the resource page based on the identifying at least one of the server or the hosting provider;
determining if one or more risk indications correspond to the identified information, the owner of the resource page, and the region of the resource page; and
in response to determining that the one or more risk indications correspond to the identified information, the owner of the resource page, and the region of the resource page, implementing one or more security measures, wherein the implementing the one or more security measures includes:
intercepting the resource page prior to it being rendered within the web view of the application; and
providing a notification to a user of the mobile device indicating the resource page corresponds to the one or more risk indications.

15. The method of claim 14, wherein the identified information includes a uniform resource locator (URL) or an entity associated with the resource page.

16. The method of claim 14, wherein the determining if the one or more risk indications correspond to the identified information includes:
accessing a blacklist database and identifying if the identified information corresponds to a record in the blacklist database.

17. The method of claim 14, wherein the implementing the one or more security measures further includes blocking the resource page from being rendered within the web view of the application.

18. The method of claim 14, wherein the detecting the action corresponding to the resource page being rendered within the web view of the application includes detecting a selection of a selectable element corresponding to the resource page, the selectable element provided by the application.

19. The mobile device of claim 1, wherein the determining if the one or more risk indications correspond to the identified information further comprises analyzing a network identifier associated with the mobile device against a blacklist of network resources.

20. The method of claim 14, wherein the determining if the one or more risk indications correspond to the identified information comprises analyzing a network identifier associated with the mobile device with a blacklist of network resources.

* * * * *